United States Patent
Tsai et al.

(10) Patent No.: US 11,294,040 B1
(45) Date of Patent: Apr. 5, 2022

(54) TIME-OF-INTERFERENCE LIGHT DETECTION AND RANGING APPARATUS

(71) Applicant: Optowaves, Inc., San Jose, CA (US)

(72) Inventors: Tsung-Han Tsai, Newton, MA (US); Jie Jensen Hou, El Dorato Hills, CA (US); Hao Wu, Wuhan (CN); Shanxing Su, Wuhan (CN)

(73) Assignee: Optowaves, Inc., San Jose, CA (US)

( * ) Notice: Subject to any disclaimer, the term of this patent is extended or adjusted under 35 U.S.C. 154(b) by 0 days.

(21) Appl. No.: 17/315,678

(22) Filed: May 10, 2021

(51) Int. Cl.
| | |
|---|---|
| *G01C 3/08* | (2006.01) |
| *G01S 7/4865* | (2020.01) |
| *G01S 7/481* | (2006.01) |
| *G01S 7/4863* | (2020.01) |

(52) U.S. Cl.
CPC .......... *G01S 7/4865* (2013.01); *G01S 7/4818* (2013.01); *G01S 7/4863* (2013.01)

(58) Field of Classification Search
None
See application file for complete search history.

(56) References Cited

U.S. PATENT DOCUMENTS

| | | |
|---|---|---|
| 3,901,597 A | 8/1975 | White |
| 4,174,524 A | 11/1979 | Moran |
| 5,699,151 A | 12/1997 | Akasu |
| 5,956,355 A | 9/1999 | Swanson et al. |
| 6,822,745 B2 | 11/2004 | De Groot et al. |
| 7,337,079 B2 | 2/2008 | Park et al. |
| 8,179,521 B2 | 5/2012 | Valla et al. |
| 8,558,993 B2 | 10/2013 | Newbury et al. |
| 8,659,748 B2 | 2/2014 | Dakin et al. |
| 8,675,184 B2 | 3/2014 | Schmitt et al. |
| 9,383,447 B2 | 7/2016 | Schmitt et al. |

(Continued)

FOREIGN PATENT DOCUMENTS

WO    WO2018172369 A1  *  9/2018  ............. G01S 17/34

OTHER PUBLICATIONS

"FMCW-LIDAR with tunable twin-guide laser diode," by A. Dieckmann, Electronics Letters, vol. 30, No. 4, Feb. 17, 1994, 2 pages.

(Continued)

*Primary Examiner* — Mark Hellner
(74) *Attorney, Agent, or Firm* — Saile Ackerman LLC; Stephen B. Ackerman; Billy Knowles

(57) ABSTRACT

A TOI Lidar System generates an image of an object based on the distance of various point measurements to the object. The TOI Lidar System detects the envelope of an electrical signal created from an interference light signal. The interference light signal is produced from the back-reflected light resulting from a sampling arm light emission to the object combined with a reference light emission. The reference light emission is created by splitting a pulse-modulated coherent light source's emission signal and passing the reference light emission through a reference arm. The optical interference signal is transferred to a balanced photodetector to convert to an electrical signal converted to digital data. The digital data is evaluated to determine the rising edges or falling edges of a digitized electrical interference signal to determine a time delay between the reference light emission and back-reflected light used to calculate the distance.

23 Claims, 11 Drawing Sheets

(56) References Cited

U.S. PATENT DOCUMENTS

| | | | |
|---|---|---|---|
| 9,677,870 B2 | 6/2017 | Jensen | |
| 9,702,975 B2 | 7/2017 | Brinkmeyer et al. | |
| 10,234,544 B2 | 3/2019 | Ando et al. | |
| 10,416,292 B2 | 9/2019 | de Mersseman et al. | |
| 10,663,587 B1 | 5/2020 | Sandborn et al. | |
| 10,866,319 B2 | 12/2020 | Brinkmeyer | |
| 2017/0350964 A1* | 12/2017 | Kaneda | G01S 17/58 |
| 2020/0200874 A1 | 6/2020 | Donovan | |

OTHER PUBLICATIONS

"Generation of RF Intensity-Modulated Laser Pulses by Dual-Frequency Injection Seeding," by Li Jun Cheng et al., IEEE Photonics Journal, vol. 10, No. 1, Feb. 2018, 10 pages.

"Sensitivity advantage of swept source and Fourier domain optical coherence tomography," by Michael A. Choma et al., Optics Express 2183, vol. 11, No. 18, Sep. 8, 2003, 7 pages.

"Understanding and Ameliorating Non-Linear Phase and Amplitude Responses in AMCW Lidar," by John P. Godbaz et al., Remote Sensing ISSN 2072-4292, www.mdpi.com/journal/remotesensing, © 2012 by the authors, 22 pages.

"Biaxial Resonant 7mm-MEMS Mirror for Automotive LIDAR application," bu Ulrich Hofmann et al., 2012 International Conference on Optical MEMS and Nanophotonics, Aug. 2012, pp. 150-151.

"Study on the Frequency-Modulated Continuous-Wave LiDAR Mutual Interference," by Il-Pyeong Hwang et al., 2019 IEEE 19th International Conference on Communication Technology, Oct. 16-19, 2019, pp. 1053-1056.

"Indium Phosphide Photonic Integrated Circuit Transceiver for FMCW LiDAR," by Brandon J. Isaac et al., IEEE Journal of Selected Topics in Quantum Electronics, vol. 25, No. 6, Nov./Dec. 2019, 7 pages.

"Polarization-diversity receiver using remotely delivered local oscillator without optical polarization control," by Honglin Ji et al., vol. 28, No. 15, Jul. 20, 2020, Optics Express 22882, 9 pages.

"Versatile endless optical polarization controller/tracker/demultiplexer," by Benjamin Koch et al., Apr. 2014, Optics Express 22(7):8259-76, DOI:10.1364/OE.22.008259, 18 pages.

"Novel Interferometric Method for the Measurement of Laser Wavelength/Frequency-Modulation Sensitivity," by M. Norgia et al., IMTC 2006—Instrumentation and Measurement Technology Conference, Sorrento, Italy, Apr. 24-27, 2006, pp. 444-447.

"A High Resolution, Chirped Pulse Lidar for Simultaneous Range and Velocity Measurements," by Mohammad Umar Piracha et al., CLEO:2011—Laser Applications to Photonic Applications, OSA Technical Digest (CD) (Optical Society of America, 2011), paper CMG1, 2 pages.

"Time-frequency analysis of long fiber Bragg gratings with low reflectivity," by Juan Sancho et al., Optics Express vol. 21, Issue 6, pp. 7171-7179, Mar. 25, 2013.

"Application of Time-Frequency Domain Reflectometry for Detection and Localization of a Fault on a Coaxial Cable," by Yong-June Shin et al., IEEE Transactions on Instrumentation and Measurement, vol. 54, No. 6, Dec. 2005, pp. 2493-2500.

"Realization of Multitone Continuous Wave Lidar," by Rasul Torun et al., IEEE Photonics Journal, vol. 11, No. 4, Aug. 2019, 11 pages.

"MEMS Laser Scanners: A Review," by Sven T. S. Holmstrom et al., Journal of Microelectromechanical Systems vol. 23, No. 2, Apr. 2014, pp. 259-275.

"MEMS Mirrors for LiDAR: A Review," by Dingkang Wang et al., Micromachines, MDPI, Apr. 27, 2020;11(5):456. doi: 10.3390/mi11050456, 24 pages.

"Comb-calibrated Frequency-modulated Continuous-wave Lidar," by Yang Xie et al., 2020 IEEE 7th International Workshop on Metrology for AeroSpace (MetroAeroSpace), Jun. 22-24, 2020, pp. 372-376.

"A Phase-Retrieving Coherent Receiver Based on Two-Dimensional Photodetector Array," by Yuki Yoshida et al., Journal of Lightwave Technology, vol. 38, No. 1, Jan. 1, 2020, pp. 90-100.

"A Survey on LiDAR Scanning Mechanisms," by Thinal Raj et al., Electronics 2020, 9(5), 741; https://doi.org/10.3390/electronics9050741, Apr. 30, 2020, 25 pages.

"Time-Stretched Femtosecond Lidar Using Microwave Photonic Signal Processing," by LiJie Zhao et al., Journal of Lightwave Technology, vol. 38, No. 22, Nov. 15, 2020, pp. 6265-6271.

"Coherent Detection of Backscattered Polarized Laser With Polarization Diversity Reception," by Yihua Hu et al., 2016 Fourth International Conference on Ubiquitous Positioning, Indoor Navigation and Location Based Services (UPINLBS), Nov. 2-4, 2016, pp. 271-277.

\* cited by examiner

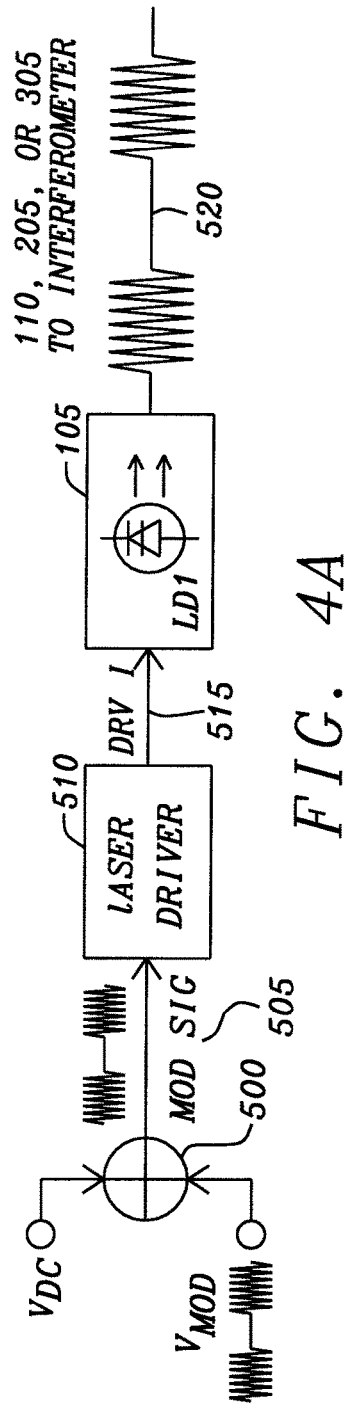
*F I G.  4A*
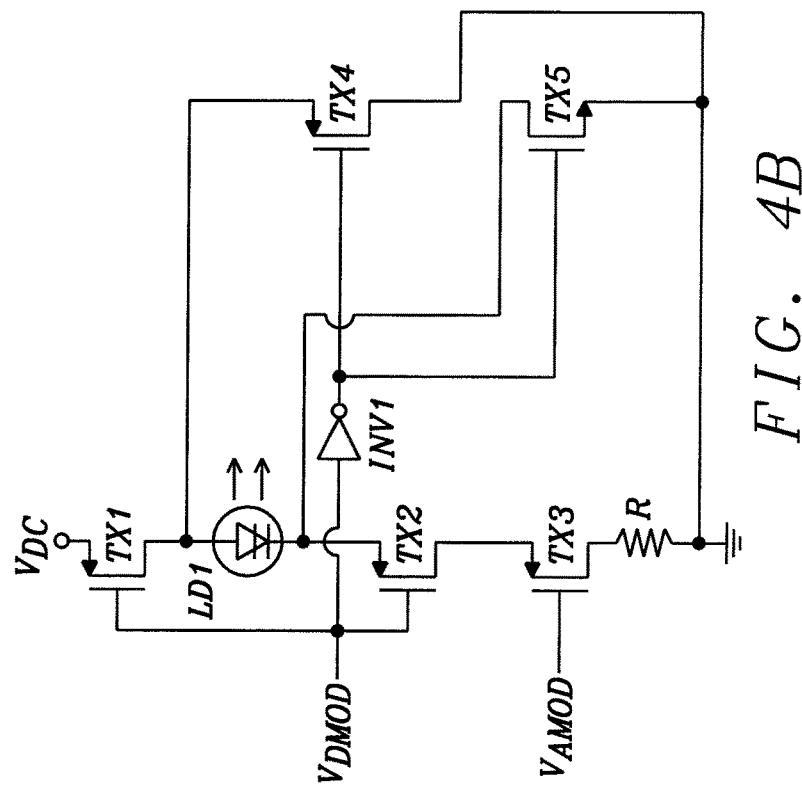
*F I G.  4B*

US 11,294,040 B1

TIME-OF-INTERFERENCE LIGHT DETECTION AND RANGING APPARATUS

TECHNICAL FIELD

This disclosure relates generally to light detection and ranging systems. More particularly, this disclosure relates to light detection and ranging systems that utilize optical interferometry devices and methods to measure distance and speed.

BACKGROUND

Light detection and ranging (LiDAR) is analogous to radio detection and ranging (Radar) in that LIDAR uses optical waves to determine the range, angle, and velocity of objects. LiDAR utilizes differences in laser light return times and wavelengths that can be used to make digital 3-D representations of the target and has been broadly used in terrestrial, airborne, and mobile applications. A LiDAR instrument consists of one or more laser emitters, optics, a scanner, a photodetector, and a signal processor. The one or more laser emitters generate a coherent light beam transferred through a set of optics to a scanner to be transmitted to an object for determining the distance to the object or the object's velocity. In the case of three-dimensional (3D) scanning, the physical features are determined. The photodetector receives the coherent light reflected from the object and converts the coherent light to electrical signals that are processed to determine the object's distance. The emitter will generate the coherent light as pulses. The signal processor records the time of the transmitted pulse, and the time of the reception of the reflection of the coherent light is recorded. The distance is the difference between the transmitted time and the received time divided by two and multiplied by the speed of light.

Amplitude modulation continuous wave (AMCW) LiDAR is a form of LIDAR that is phase-based. Unlike direct pulse detection, the phase-based LIDAR emits a continuous laser signal. It modulates the laser emission amplitude with a high-speed radiofrequency (RF) signal to encode the output optical signal. The phase difference between the emitted signal and the reflected signal is detected for ranging. The phase shift of a sinusoidally-modulated continuous laser waveform can be used to infer the distance to an object.

Frequency modulated continuous wave (FMCW) LiDAR is similar to AMCW LiDAR, but the modulation and demodulation are performed optically rather than electrically. FMCW LiDAR uses a wavelength-tuning light source and an interferometer to measure the object's distance with good sensitivity. "Comb-Calibrated Frequency-Modulated Continuous-wave Lidar, "Y. Xie et al., 2020 IEEE 7th International Workshop on Metrology for AeroSpace (MetroAeroSpace), Pisa, Italy, 2020, pp. 372-376, Found Feb. 15, 2021 at URL: https://ieeexplore.ieee.org/stamp/stamp.jsp?tp=&arnumber=9160234&isnumber=9159966 describes FMCW LIDAR as very suitable for absolute distance measurement. The FMCW laser's frequency is linearly modulated by a carrier signal to measure the laser round-trip flight time accurately. The flight time can be calculated with high precision by detecting the beat frequency signal between the returned laser and the emitted laser. High-precision distance measurement can be achieved.

SUMMARY

An object of this disclosure is to provide a time-of-interference (TOI) light detection and ranging (LiDAR) system that is based on time-frequency domain reflectometry. The TOI LIDAR system uses a time-to-digital converter or a data acquisition system to record the time delay of an interference signal or time-of-interference (TOI).

Another object of this disclosure is to provide a TOI LiDAR system based on small wavelength modulation of the coherent light source. The output wavelength is determined by the operating current or operating temperature of the coherent light source.

To accomplish at least one of these objects, a TOI LIDAR system has a coherent light source connected to a modulating controller. The modulating controller is configured to generate a pulsed wavelength control signal that is transferred to the coherent light source. The pulsed wavelength control signal may be a current modulation signal or a laser ambient temperature adjustment signal. The pulsed wavelength control signal modulates the coherent light source to generate a pulsed wavelength-modulated coherent light emission.

The pulsed wavelength-modulated coherent light emission is an input to an interferometer. The interferometer is configured for partitioning the pulsed wavelength-modulated coherent light emission into a sampling portion and a reference portion. The pulsed wavelength-modulated coherent light emission's sampling portion is arranged to impinge upon an object to be measured. The reference portion of the pulsed wavelength-modulated coherent light emission is arranged to provide a reference basis for determining the distance from the TOI LIDAR system to the object. The interferometer further is configured for transferring the pulsed wavelength-modulated coherent light to a scanner. The scanner is configured to physically transfer the pulsed wavelength-modulated coherent light's first portion to the object and scan the object's surface with the pulsed wavelength-modulated coherent light. The scanner is further configured to receive a portion of the pulsed wavelength-modulated coherent light back-reflected from the object. The back-reflected pulsed wavelength-modulated coherent light is transferred from the scanner to the interferometer and then coupled with the reference portion of the pulsed wavelength-modulated coherent light to form an optical interference light signal.

The TOI LIDAR system has a photodetector array configured to convert the optical interference signal to electrical interference signal. In various embodiments, the photodetector is configured as a polarization-diversity balanced amplified detector. The photodetector has at least one power monitor to measure the input power level to the photodetector. The power monitor output provides a modulated power level with a time delay associated with the object's distance.

The TOI LIDAR system has a signal processor configured to receive the electrical interference signal and convert the electrical interference signal to digital data representing the electrical interference signal amplitude as the digital data. The signal processor is configured to generate a displayed imaging range based on the distance from the target. The displayed imaging range is calculated by a computer system programmed to calculate the time delay determined by the optical interference signal.

The modulating controller is configured to generate a wavelength modulation control signal to modulate the coherent light source by controlling the narrow coherent light source's driving current, the temperature of the narrow bandwidth light source, or adjusting the phase of the light emitted from the light source. In other embodiments, the modulating controller will generate a pulsed phase control signal for generating interference when there is a time delay between light in the sample and reference arms of the interferometer.

In various embodiments, the interferometer includes a polarization controller used to adjust the polarization states of the coherent light emission from the light source and maximize the amplitude of the optical interference signal or interference electrical signal. The interferometer has a first coupler that receives the pulsed wavelength-modulated coherent light from the polarization controller. The coupler divides the pulsed wavelength-modulated coherent light. A first portion of the pulsed wavelength-modulated coherent light is fed into at least one sample arm. A second portion of the pulsed wavelength-modulated coherent light is fed to a reference arm. The interferometer has a circulator connected to receive the first portion of the pulsed wavelength-modulated coherent light from the at least one sample arm. The circulator is configured such that the pulsed wavelength-modulated coherent light from the sample arm enters the circulator and exits from the next port. Generally, the next port is in a clockwise direction to direct the pulsed wavelength-modulated coherent light to the scanner. The scanner is configured to physically transfer the sample pulsed wavelength-modulated coherent light to scan the objects. The sampled pulsed wavelength-modulated coherent light is back-reflected from the object for making ranging measurements to the scanner and transferred to the circulator within the interferometer. The back-reflected pulsed wavelength-modulated coherent light is then transmitted from the circulator to a second coupler.

The interferometer's reference arm has a length greater than two times the sampling arm's length. The second portion of the pulsed wavelength-modulated coherent light in the reference arm is applied to the second coupler. The second portion of the pulsed wavelength-modulated coherent light transported in the reference arm is coupled with the collected back-reflected pulsed wavelength-modulated light to form an optical interference light signal. The optical interference light signal exits the second coupler to enter a photodetector array.

The reference arm's optical path length is longer than the sample arm's optical path length by more than two times the system's maximum ranging depth. The maximum frequency of the optical interference signal corresponds to the minimum ranging depth of the system.

The maximum frequency of the optical interference signal corresponds to the minimum ranging depth of the TOI LIDAR system. It is greater than a Nyquist sampling frequency of the digitizer in the data acquisition and signal processor. The minimum frequency of the optical interference signal corresponds to the maximum ranging depth of the TOI LIDAR system. The time delay of the detected optical interference is measured at the falling edge of the optical interference signal's envelope.

BRIEF DESCRIPTION OF THE DRAWINGS

FIG. 4A is a block diagram of a small-signal modulator embodying the principles of this disclosure.

FIG. 4B is a schematic of a small-signal coherent light source embodying the principles of the present disclosure.

DETAILED DESCRIPTION

A TOI Lidar System is configured to generate an image of an object based on the distance of various point measurements to the object. The TOI Lidar System detects the envelope of an electrical signal created from an interference light signal. The interference light signal is produced from the back-reflected light resulting from a sampling arm light emission to the object and a reference light emission. The reference light emission is created by splitting a pulsed wavelength-modulated coherent light source's emission signal and passing the reference light emission through a reference arm. The optical interference signal is transferred to a photodetector for conversion to an electrical signal that is converted to digital data that is evaluated to determine falling edges of the reference light emission and the back-reflected light to determine a time delay between the reference light emission and back-reflected light. From the time delay, the distance is then calculated.

Figure 1A:
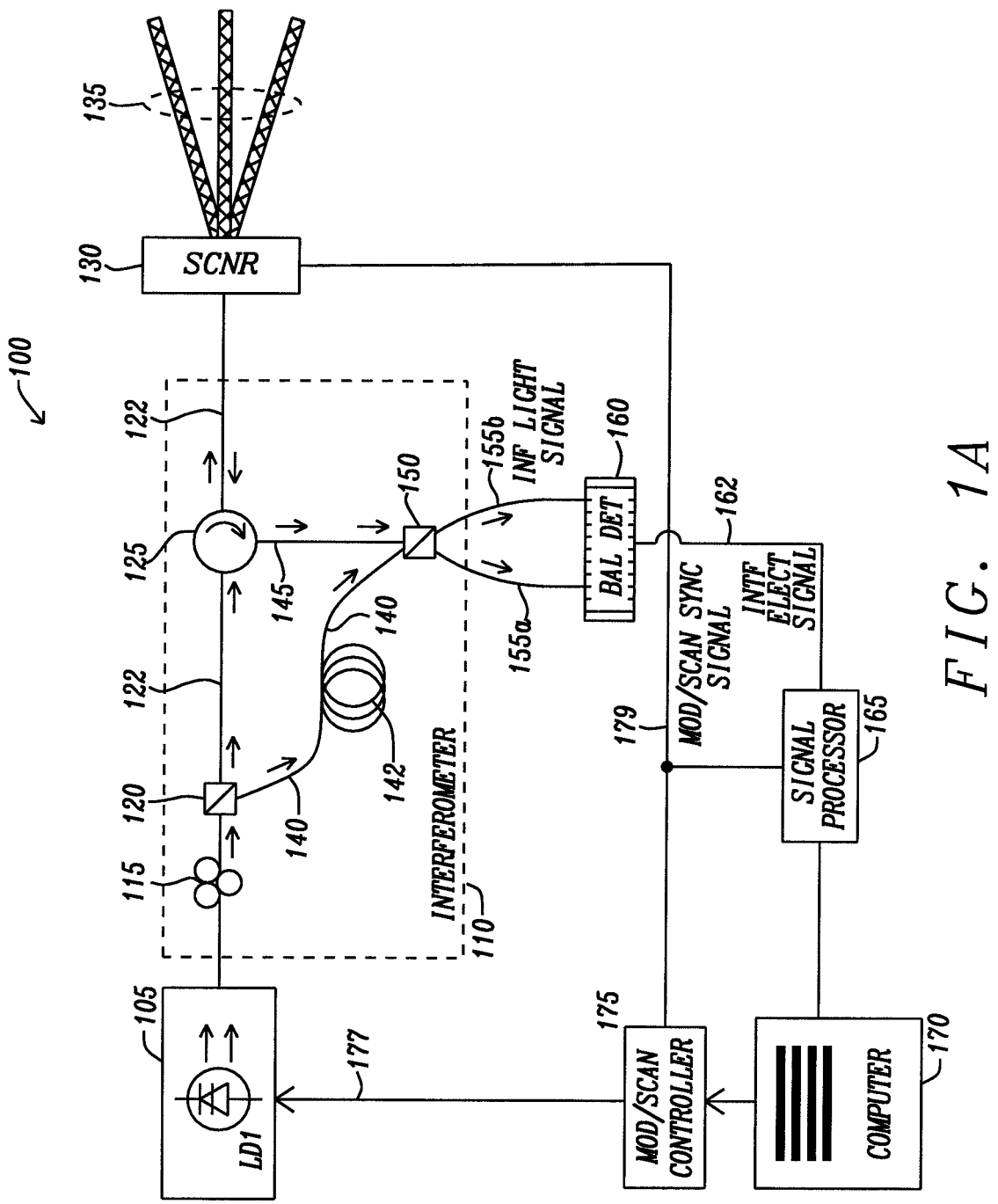
FIGS. 1A, 1B, 1C are schematic drawings of a TOI Lidar System embodying the principles of the present disclosure.
Figure 1B:
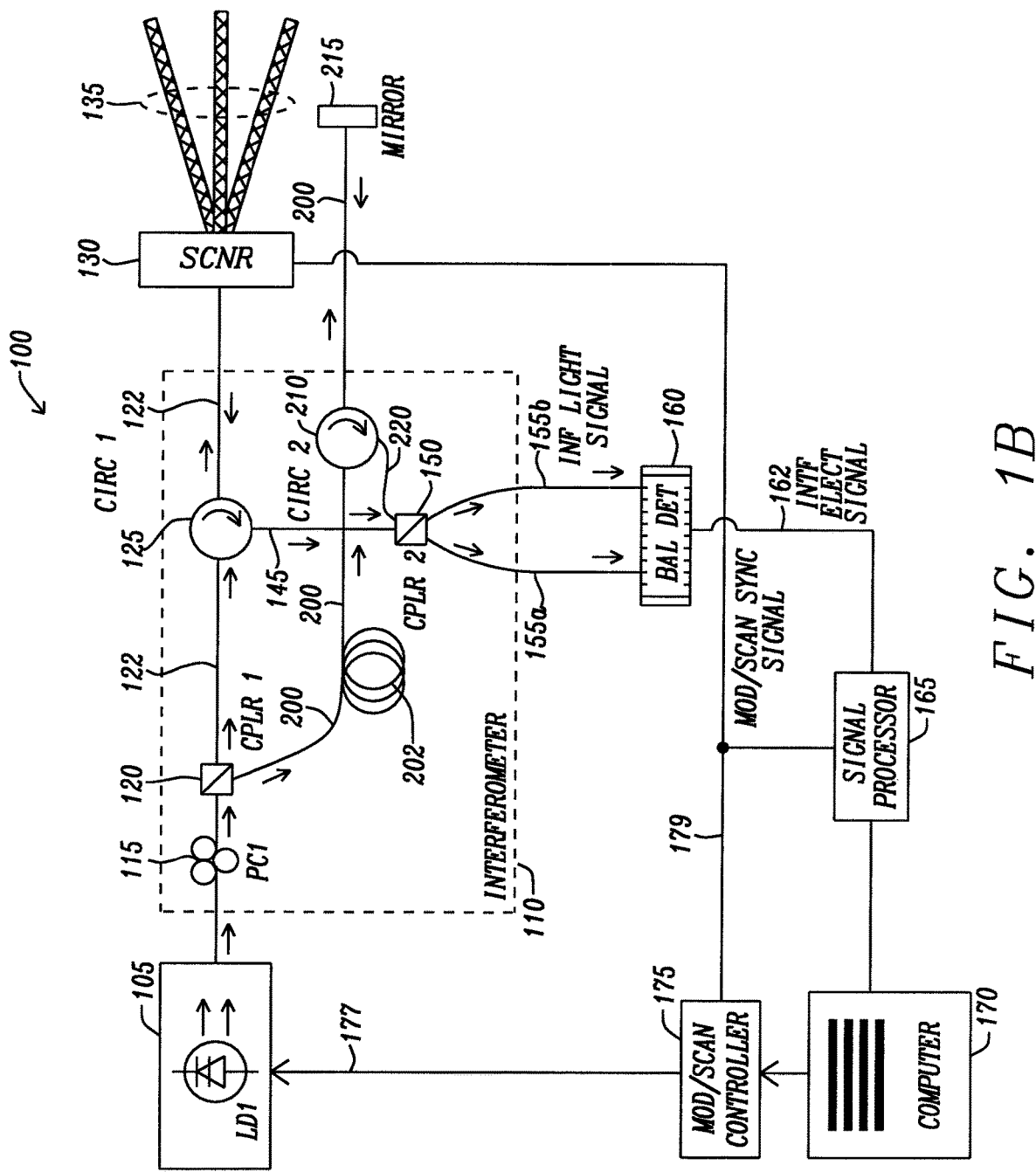
Figure 1C:
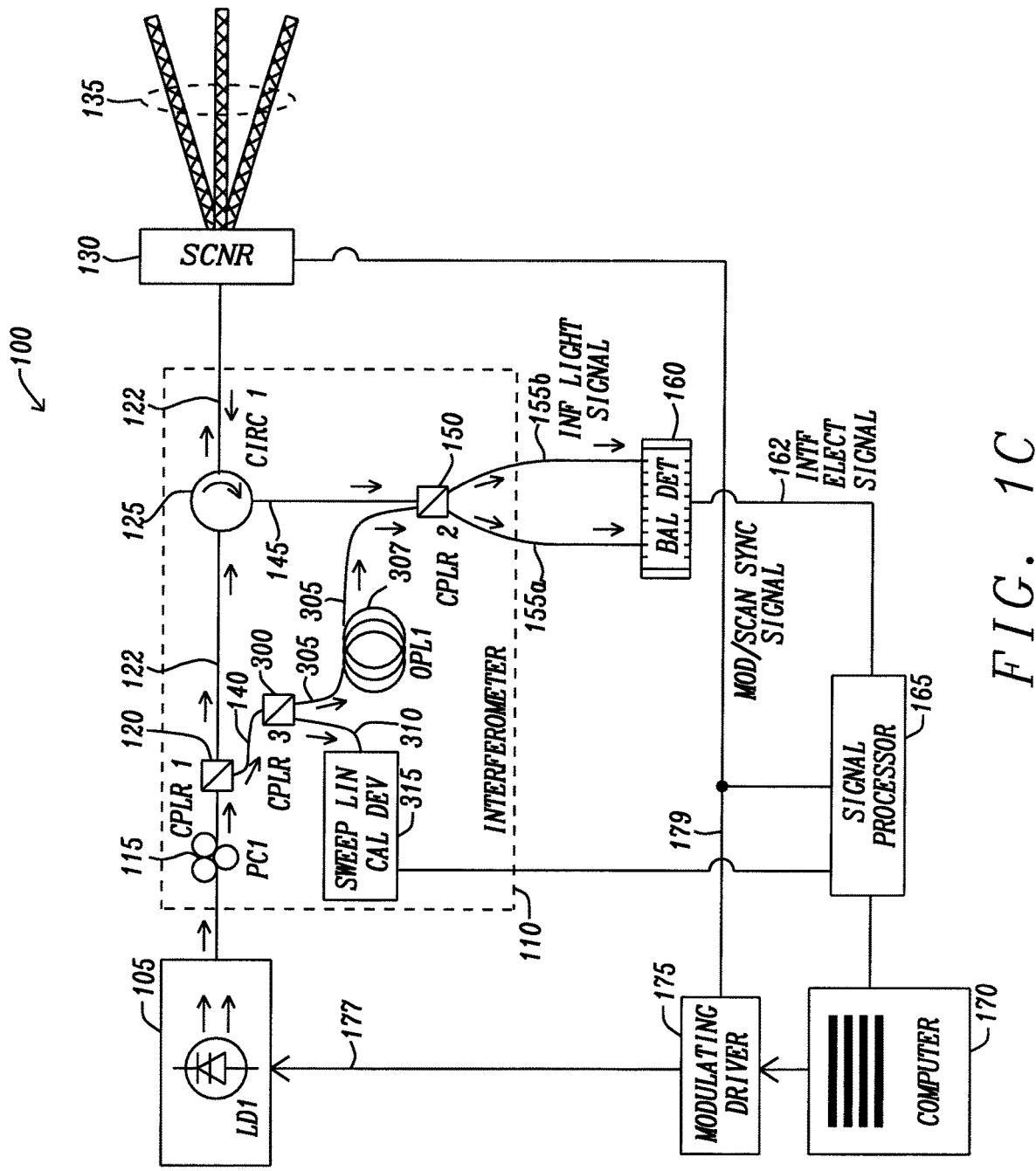

FIGS. 1A, 1B, 1C are schematic drawings of a TOI Lidar System embodying the principles of the present disclosure. Referring to FIG. 1A, a TOI LiDAR system 100 includes a pulsed wavelength-modulated narrow bandwidth light source 105. The pulsed wavelength-modulated light source 105 emits a pulse modulated coherent light having an output spectrum composed of single or multiple longitudinal modes. A longitudinal mode of a resonant cavity is a particular standing wave pattern formed by waves confined in the cavity. In a laser, the light is amplified in a cavity resonator, usually composed of two or more mirrors. The cavity has mirrored walls that reflect the light to allow standing wave modes to exist in the cavity with little loss.

The longitudinal modes correspond to the reflecting waves' wavelengths reinforced by constructive interference after many reflections from the cavity's reflecting surfaces. All other wavelengths are suppressed by destructive interference. A longitudinal mode pattern has its nodes located axially along the length of the cavity. The pulsed wavelength-modulated light source 105 is implemented as one of four types of lasers that are known in the art and are categorized as a solid-state laser, a gas laser, a liquid laser, or a semiconductor laser. In the discussion of the structure of this disclosure, the pulsed wavelength-modulated light source 105 is shown as a semiconductor laser that has its wavelength controlled by either current or temperature. The modulation of the pulsed wavelength-modulated light source 105, as is described hereinafter.

The pulsed wavelength-modulated narrow band light source 105 emits the pulsed wavelength-modulated coherent light to an interferometer 110. The pulsed wavelength-modulated narrow bandwidth light source 105 emission is through free-space, an optical fiber, or an optical waveguide to the interferometer 110

The interferometer 110, in various embodiments, is implemented as fiber optics, bulk optics, integrated photonic circuitry, or some combinations thereof. The interferometer 110 has a polarization controller 115 that receives the pulsed wavelength-modulated coherent light. The polarization controller 115 adjusts the polarization states of the pulsed wavelength-modulated coherent light from the light source 105. It maximizes the amplitude of the optical interference signals transferred in the optical paths 155a and 155b or interference electrical signal 162. The pulsed wavelength-modulated coherent light from the light source 105 or the pulsed wavelength-modulated coherent light transferred through the polarization controller 115 is applied a coupler 120. The coupler 120 divides the coherent light into a sample portion fed into at least one sample arm 122 and a reference portion of the pulsed wavelength-modulated coherent light fed into a reference arm 140 within the interferometer 110. The sample arm 122 and the reference arm 140 are implemented as a free-space path, an optical fiber, or an optical waveguide.

The interferometer has a circulator 125 that receives the sample portion of the pulsed wavelength-modulated coherent light from the sample arm 122. The circulator 125 is configured such that the sample portion of the pulsed wavelength-modulated coherent light enters the circulator 125 and exits from the next port to a section of the sample arm 122. The next port is generally, but not required, in a clockwise direction to direct the coherent light through the sample arm 122 to a scanner 130. The scanner 130 is configured to physically transfer the sample pulsed wavelength-modulated coherent light 135 to scan the object. The sampled pulsed wavelength-modulated coherent light 135 is back-reflected from the object for making the ranging measurements. The back-reflected pulsed wavelength-modulated coherent light is received by the scanner 130 and transferred to the circulator 125. The back-reflected pulsed wavelength-modulated coherent light through the optical path 145 is then transferred to a second coupler 150. The optical path is implemented as a free-space path, an optical fiber, or an optical waveguide.

The reference arm 140 as implemented as a free-space path, an optical fiber, or an optical waveguide, has additional optical path 142 that provides additional path length such that the reference arm's 140 path length matches the maximum ranging depth of the TOI LiDAR system 100. The optical pulsed wavelength-modulated coherent light signals from the at least one sample arm 122 and the reference arm 140 are combined in the coupler 150 to generate an optical interference signal.

The pulsed wavelength-modulated coherent light signals from the at least one sample arm 122 and the reference arm 140 are heterodyne detected to extract the beating frequency from the base signal. The beating signal has a 180° phase difference in the two outputs from the coupler. The balanced detector 160 subtracts the signal from each input channel to extract the interference signal that is the beating signal.

The optical interference signal is applied to the optical paths 155a and 155b implemented as a free-space path, an optical fiber, or an optical waveguide. The optical interference signal is applied to the optical paths 155a and 155b is transferred to a balanced photodetector 160 to convert the optical interference signal from the optical paths 155a and 155b into an interference electrical signal 162.

The interference electrical signal 162 is generated by the balanced photodetector 160 and transferred to a data acquisition circuit within a signal processor 165, where the interference electrical signal 162 is converted into digital data. The maximum frequency of the optical interference signal corresponds to the minimum ranging depth of the TOI LIDAR system. The optical interference signal's maximum frequency is greater than a Nyquist sampling frequency of the digitizer in the data acquisition or the signal processor 165.

The minimum frequency of the optical interference signal as applied to optical paths 155a and 155b corresponds to the maximum ranging depth of the TOI LIDAR system 100. The time delay of the detected optical interference is measured at the falling edge of the optical interference signal's envelope.

The digital data is then transmitted to a computer 170 for further processing and display. The signal processor 165 in some embodiments may be integrated with the computer 170 as a single unit.

In various embodiments, the computer 170 is connected to a modulation/scanning controller 175. In other embodiments, the computer 170 is integrated with the modulation/scanning controller 175. The modulation/scanning controller 175 has a modulation subcircuit that determines the modulation, frequency, and shape of the modulation control signal 177 applied to the coherent light source 105. The modulation/scanning controller 175 further has a scanning control circuit that provides a modulation/scan synchronization signal 179 to the signal processor 165 and the scanner 130. The scanning control circuit creates a desired scan pattern that is used to generate appropriate modulation/scan synchronization signal 179 that is applied to the scanner 130

The scanner 130 may be implemented as a 1-dimensional or 2-dimensional scanner to distribute the sample pulsed wavelength-modulated coherent light 135 to form an image based on the TOI measurement. The 1-dimensional scanning pattern may be linear or non-linear in time and maybe unidirectional or bidirectional. In some implementations of the TOI Lidar system 100, the 2-dimensional scanning pattern may be linear or non-linear in time. It may be in the form of a raster scan, spiral scan, or other patterns to collect the measurement information. The scanner 130 may be realized mechanically as galvanometer mirrors, micro-electro-mechanical systems (MEMS), piezo actuators, or optically including acousto-optic (AO) deflector, or a solid-state scanner. There may be other methods in keeping with the principles of the present disclosure of providing the required scanning motion to collect the measurement information.

Referring to FIG. 1B, the TOI LiDAR system 100 has the same structure as that of FIG. 1A, but the second portion of pulsed wavelength-modulated coherent light is applied to the reference arm 200. The fiberoptic cable of reference arm 200 as implemented as a free-space path, an optical fiber, or an optical waveguide, has additional optical path 142 such that the reference arm's 200 optical path length matches the maximum ranging depth of the TOI LiDAR system 100. The pulsed wavelength-modulated coherent light in the reference arm 200 is applied to an input port of a second circulator 210. The pulsed wavelength-modulated coherent light is transmitted out the input/output port of the second circulator 210 to an additional segment of the reference arm 200. The coherent light impinges upon a mirror 215. The mirror 215 provides a delay in the coherent light and, in some embodiments, is replaced with an optical delay line. The mirror 215 directly reflects the coherent light back to the second circulator 210 and is directed to the coupler 150. The mirror reflected coherent light is coupled with the back-reflected pulsed wavelength-modulated coherent light to form the optical interference signal. The mirror 215 serves as a reference image plane that corresponds to the maximum range of the TOI LIDAR system 100. The mirror 215 permits additional path length 202 to be half of the length if it is located between the second circulator 210 and the mirror 215 due to double pass of the light. The mirror 215 permits cost savings and space savings.

The replacement of the mirror 215 with an optical delay line permits an increase in the flexibility of fine-tuning the total reference arm path length. The tunable range of the delay is typically in the order of centimeters, so it is mainly to accommodate the small change of system variation rather than changing the overall imaging range.

The optical interference signal is applied to the optical paths 155a and 155b implemented as a free-space path, an optical fiber, or an optical waveguide. The optical interference signal as applied to the optical paths 155a and 155b is transferred to a balanced photodetector 160 to convert the optical interference signal from the optical paths 155a and 155b into an interference electrical signal 162 as described above.

In some implementations, the reference arm 140 of FIG. 1A and 200 of FIG. 1B may have a longer optical path length than the sample arm 103. The timing of the interference of the pulsed wavelength-modulated coherent light signals from the sampling arm 122 and reference arm 140 and 200 is at the falling edge of the interference envelope. In various embodiments, the reference arm 140 and 200 may have a shorter optical path length than the sample arm 122. The occurrence of the timing of the interference of the pulsed wavelength-modulated coherent light signals from the sampling arm 122 and reference arm 140 and 200 is at the rising edge of the interference envelope.

Referring to FIG. 1C, the TOI LiDAR system 100 has the same structure as that of FIG. 1A, but the second portion of the pulsed wavelength-modulated coherent light of the reference arm 140 leaves the first coupler 120 enters a third coupler 300. The reference arm 140 being implemented as a free-space path, an optical fiber, or an optical waveguide. The third coupler 300 further divides the second portion of the pulsed wavelength-modulated coherent light into two pulsed wavelength-modulated coherent light beams. A first fraction of the second portion of the pulsed wavelength-modulated coherent light beams is applied to a second reference arm 305 that is similarly implemented as a free-space path, an optical fiber, or an optical waveguide. The second fraction of the second portion of the pulsed wavelength-modulated coherent light beam of the second reference arm 305 is applied to a sweep linear calibration device 315.

The sweep linear calibration device 315 is a Mach-Zehnder interferometer or a Fabry-Perot filter that generates an electrical signal to calibrate the coherent light source's 105 linearity of the wavelength sweep. If the wavelength modulation is not linear in the optical frequency domain, sweep linear calibration device 315 generates an interference signal from a fixed pathlength difference from either the Mach-Zehnder interferometer or a Fabry-Perot filter. It typically involves a photodetector or balanced detector to generate an electrical signal. Its zero-crossing timing corresponds to equal spaces in the optical frequency domain and provides an optical clock for the data acquisition system within the signal processor 165. The sweep linear calibration device 315 calibrates the interference signal 162 detected by the balanced detector 160. The output of the sweep linear calibration device 315 is transferred to the signal processor 165.

The reference arm's 305 second pulsed wavelength-modulated coherent light beam is applied to the second coupler 150. As described above, the back-reflected coherent light is directed to the coupler 150. The reference coherent light in the reference arm 305 is coupled with the back-reflected coherent light to form the optical interference signal. The optical interference signal is applied to optical path 155a and 155b is implemented as a free-space path, an optical fiber, or an optical waveguide. The optical interference signal is transferred through the optical path 155a and 155b to be transferred to a balanced photodetector 160 to convert the optical interference signal from the optical paths 155a and 155b into an interference electrical signal 162, as described above.

Figure 2A:
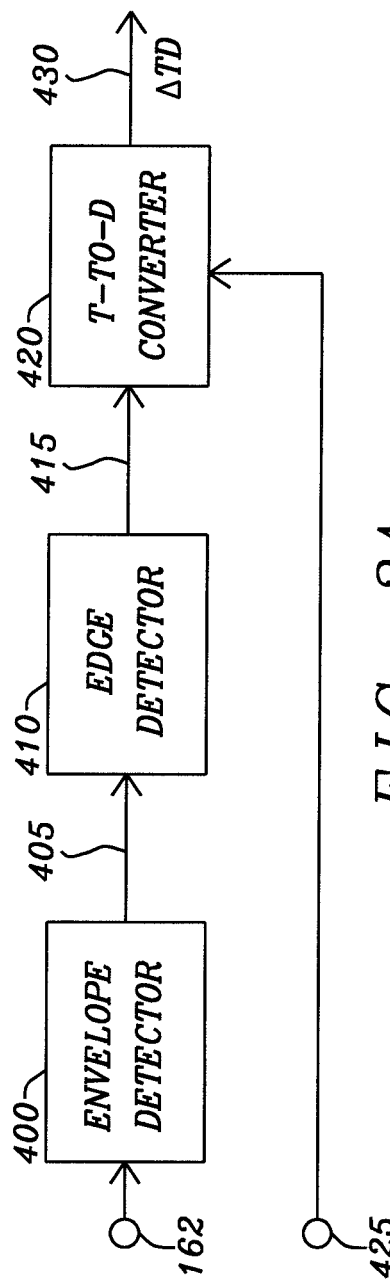
FIG. 2A is a block diagram of an electrical TOI measurement circuit embodying the principles of the present disclosure.

FIG. 2A is a block diagram of an electrical TOI measurement circuit embodying the principles of the present disclosure. The interference electrical signal 162 of FIGS. 1A, 1B, and 1C generated from the balanced detector 160 is received by an envelope detector 400 and converted to an envelope 405 of the interference electrical signal 162. The envelope detector 400 is implemented as a radiofrequency (RF) power detector, a root mean square (RMS) detector, or a frequency demodulator. The radiofrequency (RF) power detector, the root mean square (RMS) detector, or the frequency demodulator are known in the art and are commercially available devices. The radiofrequency (RF) power detector, the root mean square (RMS) detector, or the frequency demodulator remove the high-frequency components in the interference electrical signal 162 and thus identify the envelope of the interference electrical signal 162.

The envelope signal 405 is transferred to an edge detector 410. The edge detector 410 determines a pulse event and places the pulse event at the edge detector's output 410. The pulse event indicates the leading or falling edge of the envelope signal 405. The edge detector 410 is realized as an edge-to-glitch converter, an XOR gate and delay circuit, a differentiator circuit, or the like. The edge-to-glitch converter, the XOR gate and delay circuit, the differentiator circuit are similarly known in the art and are commercially available.

The edge detector's output 415 is connected to an input of a time-to-digital converter 420. The time-to-digital converter 420 generates a time difference signal transferred to the output 430 of the time-to-digital converter 420. The time difference signal indicates the time between the rising edge or falling edge pulse event 405 and the pulse event 425. The pulse event 425 corresponds to the rising edge or the falling edge of the light source modulating signal as transferred from the modulation/scanning controller 175. The pulse event 425 is the trigger for starting the time-to-digital converter 420 in counting the time intervals. The pulse output 415 of the edge detector 410 provides the pulse event for terminating the counting of the time intervals by the time-to-digital converter 420. A series of time difference signals at the output 430 of the time-to-digital converter 420 is translated into the depth measurements to form images displayed by the computer 170.

Figure 2B:
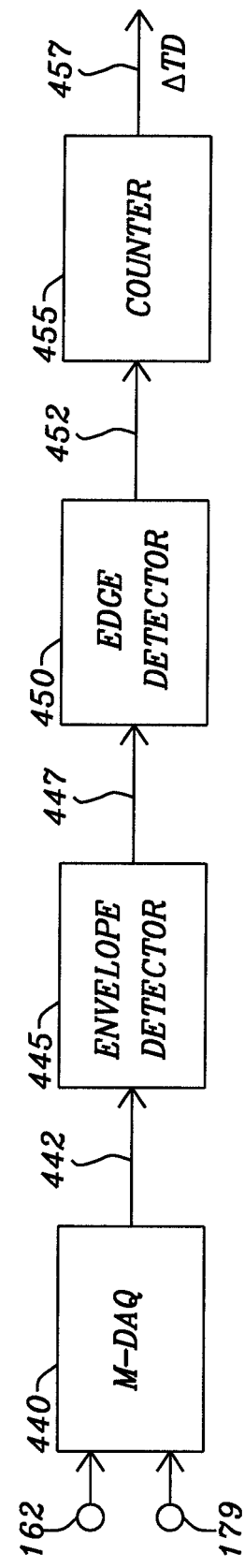
FIG. 2B is a block diagram of a program structure of a signal processor configured for performing an electrical TOI measurement embodying the principles of the present disclosure.

FIG. 2B is a block diagram of a program structure of a signal processor embodying the principles of the present disclosure. The interference electrical signal 162 of FIGS. 1A, 1B, and 1C generated from the balanced detector 160 is digitized by a data acquisition module 440. The data acquisition module 440 is triggered by the modulation/scan synchronization signal 179 from the modulation/scanning controller 175. The interference electrical signal is converted to a digitized signal 442 and is placed at the output of the data acquisition module 440. The maximum frequency of the interference electrical signal 162 corresponds to the minimum ranging depth of the TOI LIDAR system 100 and is greater than a Nyquist sampling frequency of the digitizer of the data acquisition module 440. The minimum frequency of the interference electrical signal corresponds to the maximum ranging depth of the TOI LIDAR system 100. The time delay of the detected interference electrical signal 162 is measured at the falling edge of the interference electrical signal's 162 envelope.

The digitized signal 442 is processed by an envelope detector process 445 executed by the signal processor 165 to determine an envelope signal 447 of the digitized interference electrical signal 442. The envelope detector process 445 is executed by taking the absolute value of a Hilbert transform of the digitized signal 442. The envelope signal 447 is then processed by an edge detection process 450 to identify the interference electrical signal's occurrence timing, and the time difference 457 between the rising edge or the falling edge of the envelope signal 447 and modulation/scan synchronization signal 179 can be calculated.

Figure 2C:
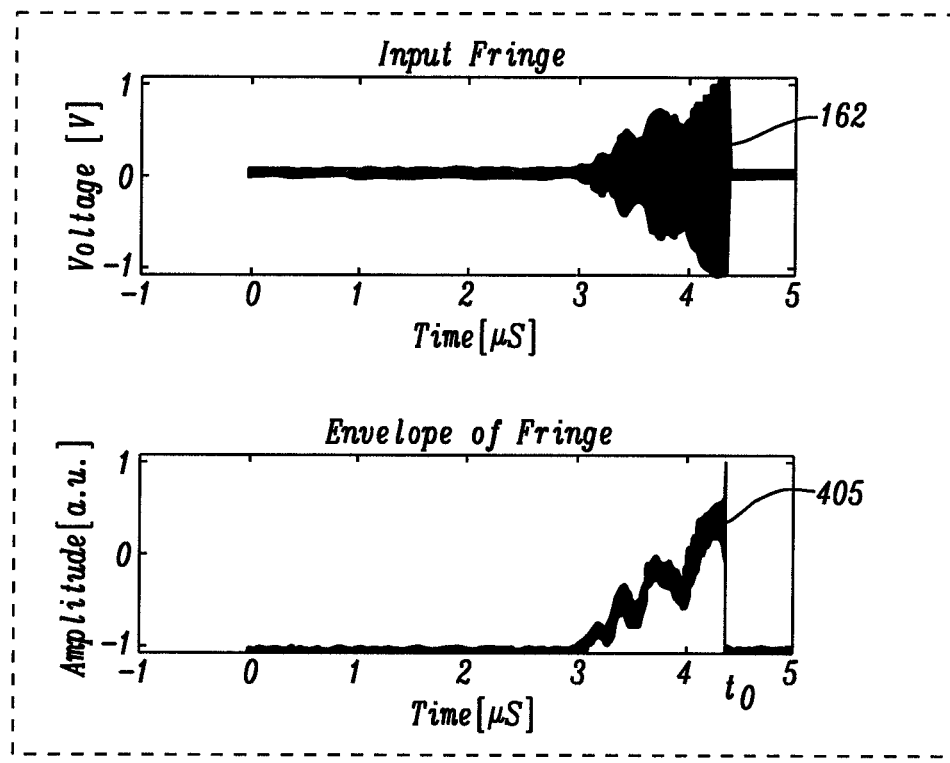
FIG. 2C is a plot of the reference arm's pulse input fringe and envelope embodying the principles of the present disclosure.
Figure 2D:
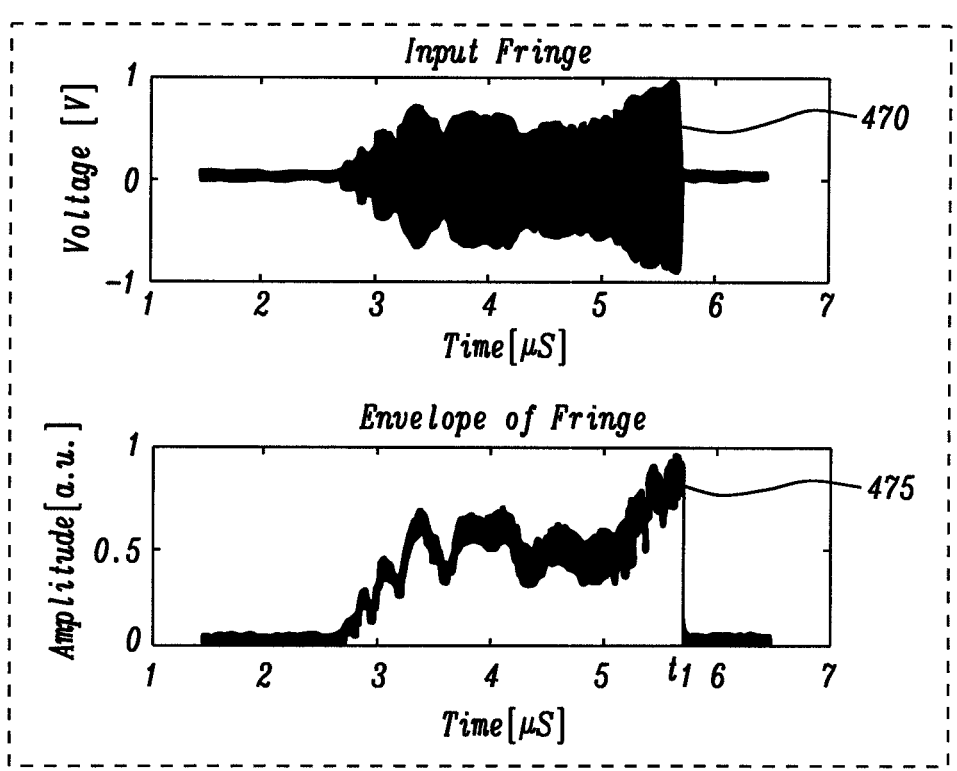
FIG. 2D is a plot of the sample arm's back-reflected pulse fringe and envelope embodying the principles of the present disclosure.

FIG. 2C is a plot of the reference arm's pulse input fringe 460 and envelope 465 embodying the principles of the present disclosure. The plots of FIG. 2C are an example interference electrical signal of the prototype TOI system 100 detecting an object at a zero (0) meter location. FIG. 2D is a plot of the sample arm's back-reflected pulse fringe 470 and envelope 475 embodying the principles of the present disclosure. The plots of FIG. 2D are an example interference electrical signal of the prototype TOI system 100 detecting an object at 180 m location. The edge detector 410 of FIG. 2A or the edge detector process 450 of FIG. 2B determines the time of the falling edge $t_0$ of the envelope of the reference arm 460 and the time of the falling edge $t_1$ of the envelope of the sample arm 475. The counter 420 or the counter process 455 counts the time interval between the reference arm's falling edge time $t_0$ and the sample arm's falling edge time $t_1$. The distance from to the object being measured is determined by the equation:

$$\text{Distance} = c*(t_0 - t_1)$$

Where:
c is the speed of light.
$t_0$ is the reference arm's falling edge time.
$t_1$ is the sample arm's falling edge time.
A series of time differences 457 can be translated into the depth information and form images displayed by the computer 170.

Figure 3:
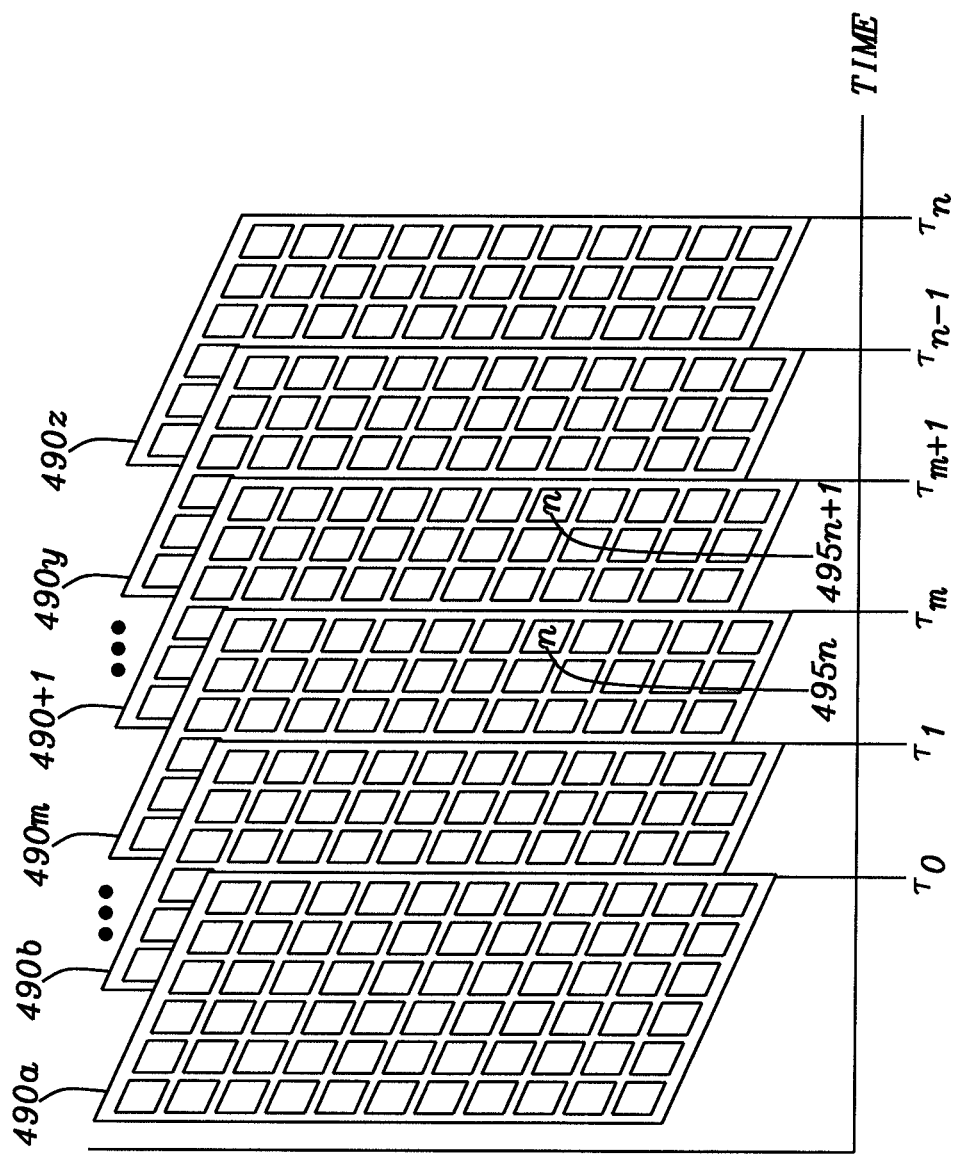
FIG. 3 illustrates the frame-based velocity measurement method of the TOI LIDAR system embodying the principles of the present disclosure.

FIG. 3 illustrates the frame-based velocity measurement method of the TOI LiDAR system embodying the principles of the present disclosure. Each frame 490a, 490a, 490b, . . . , 490m, 490m+1, . . . , 490y, 490z is captured by the balanced photodetector 160 of FIGS. 1A, 1B, and 1C and represents the data 495n and 495m+1. The data 495n and 495m+1 are transferred to the signal processor 165 and processed as described in FIGS. 2A and 2B to thus determine the rising edges or falling edges of the data. Therefore, the determination of the rising edges or falling edges of the data provides the time difference between the data 495n and 495m+1. The distance between the data 495n and 495m+1 is then determined as the time difference $(t_{m+1}-t_m)$ between the data 495n and 495m+1. The time difference $(t_{m+1}-t_m)$ between the data 495n and 495m+1 is multiplied by the frame rate of the optical interference signal's sampling applied to optical paths 155a and 155b to determine the velocity of the object being measured.

FIG. 4A is a block diagram of a small-signal modulator incorporated in the modulation driver of FIGS. 1A, 1B, and 1C embodying the principles of this disclosure. The small-signal modulator has a summing circuit 500 connected to receive a DC voltage source $V_{DC}$ and a modulating voltage $V_{MOD}$. The summing circuit 500 additively combines the DC voltage source $V_{DC}$ and the modulating voltage $V_{MOD}$ to form the modulating signal 505. The modulating signal 505 has an amplitude smaller than the Voltage source $V_{DC}$ voltage and is chosen from the group of waveforms, including a square wave, triangular wave, sinusoidal wave, shark's tooth wave, or any arbitrary waveform, and even a combination of the waveforms. The modulating signal 505 is applied to the laser driver 510. The voltage of the modulating signal 505 is converted to a current to drive the coherent light source 105. Alternately, the converted current of the modulating signal 505 is applied to a thermoelectric cooling device that t is used to stabilize the temperature of the laser diode of the coherent light source 105. By injecting the modulating current through the thermoelectric cooling device, the temperature of the laser diode of the coherent light source 105 is changed. The laser diodes of the coherent light source 105 have a built-in thermistor for monitoring the diode temperature. This permits the thermoelectric cooling device and the thermistor to form a control loop that provides temperature monitoring and precise temperature modulation.

The coherent light source 105 emits the coherent light signal 520 to the interferometer. The waveform modulation in wavelength/optical frequency is chosen to introduce optical interference when there is optical path length difference between the sample arm 122 and reference arms 140 of FIG. 1A, 200 of FIG. 1B, and 305 of FIG. 1C.

FIG. 4B is a schematic of a small-signal modulated coherent light source as described in FIG. 4A, embodying the principles of the present disclosure. A power supply voltage source $V_{DC}$ is applied to the source of a first PMOS transistor TX1. The drain of the first transistor TX1 connects to a coherent light source LD1 (105 of FIGS. 1A, 1B, and 1C). The gate of the first transistor TX1 is controlled by the digital modulation signal $V_{DMOD}$. The coherent light source LD1 is connected to the source of a second transistor TX2, where its gate is also controlled by the digital modulation signal $V_{DMOD}$. The drain of the second PMOS transistor TX2 is connected to the source of a first NMOS transistor TX3, where its gate is controlled by an analog modulation signal $V_{AMOD}$, and its drain is connected to a resistor R which then is connected to the common ground. High and low levels of the digital modulation signal $V_{DMOD}$ can turn on and off the light source 410, respectively. While the digital modulations signal $V_{DMOD}$ is high, the analog modulation signal $V_{AMOD}$ can provide a small signal modulation to the light source LD1. The light source LD1 can be deactivated with a short transition time by an inverter INV1. The inverter INV1 is used to invert the digital modulation signal $V_{DMOD}$ and control the gates of a third PMOS transistor TX4 and a second NMOS transistor TX5. The source of the third PMOS transistor TX4 and the drain of the second NMOS transistor TX5 are connected to the light source LD1. The drain of the third PMOS transistor TX4 and the source of the second NMOS transistor TX5 are connected to the ground. While the digital modulation signal $V_{DMOD}$ transitions from high to low, the third PMOS transistor TX4 and a second NMOS transistor TX5 are switched on and will immediately drain the current within the light source LD1, and thus will generate a short transition time for TOI applications.

Figure 5A:
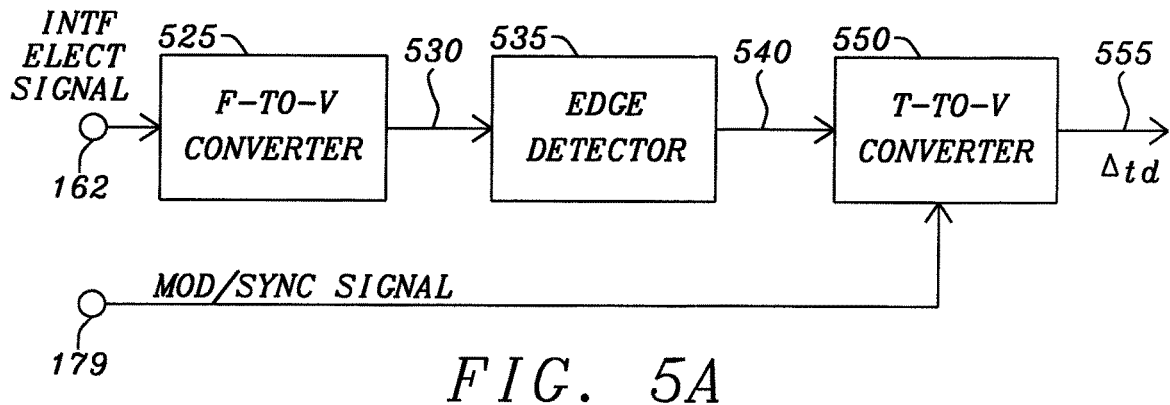
FIG. 5A is a block diagram of an SSM-TOI electrical measurement circuit embodying the principles of the present disclosure.

FIG. 5A is a block diagram of an SSM-TOI electrical measurement circuit embodying the principles of the present disclosure. The interference electrical signal 162 generated from the balanced detector 160 is received by a frequency-to-voltage converter 525. The frequency of the interference electrical signal 162 is converted to a voltage at the output 530 of the frequency-to-voltage converter 525. The voltage is proportional to the frequency of the interference electrical signal 162. The frequency-to-voltage converter 525 is formed of an FM demodulator, a frequency detector, or any frequency-to-voltage converter circuits known in the art. The voltage level at the output 530 is the input to the edge detector 535 that generates a pulse at the output 540 of the edge detector 535. The pulse corresponds to the rising edge, or the voltage level's rising edge or falling edge at the output 530 of the frequency-to-voltage converter 525. The edge detector 535 is formed by an edge-to-glitch converter, an XOR gate and delay circuit, a differentiator circuit, or any edge detector circuit known in the art. A time-to-digital converter 550 generates a time difference signal $\Delta_{TD}$ at the output 555 of the time-to-digital converter 550. The time difference signal $\Delta_{TD}$ is the difference between the rising edge or falling edge pulse at the output 540 of the edge detector 535 and the modulation/scan synchronization signal 179 from the modulation/scanning controller 175. A series of time differences 507 are translated into the depth to form images displayed by the computer 170.

Figure 5B:
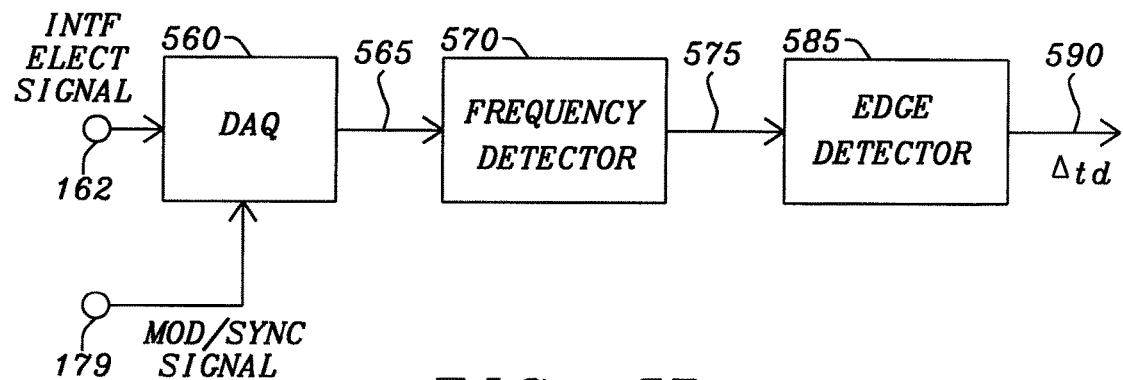
FIG. 5B is a block diagram of a program structure of a signal processor configured for performing an SSM-TOI electrical measurement embodying the principles of the present disclosure.

FIG. 5B is a block diagram of a program structure of a signal processor 175 configured for performing an SSM-TOI electrical measurement embodying the principles of the present disclosure. The interference electrical signal 162 generated from the balanced detector 160 is digitized by a data acquisition module 605 triggered by modulation/scan synchronization signal 179 from the modulation/scanning controller 175. The interference electrical signal 162 is converted to an interference digitized signal at the output 565. The maximum frequency of the interference electrical signal 162 corresponds to the minimum ranging depth of the TOI LIDAR system 100 and is greater than a Nyquist sampling frequency of the digitizer in the data acquisition module 605.

The minimum frequency of the optical interference signal as applied to optical paths 155a and 155b corresponds to the maximum ranging depth of the TOI LIDAR system 100. The time delay of the detected electrical interference 162 is measured at the falling edge of the interference electrical signal's 162 envelope. The interference digitized signal is processed by a frequency detector process 570 to identify its instantaneous frequency value at the output 575 of the frequency detector process 570. The frequency detector process 570 executes such methods as a short-time Fourier transformation, a wavelet transformation, or another frequency detector process known in the art. The instantaneous frequency value at the output 575 of the frequency detector process 570 is then processed by an edge detector process 585 to identify the occurrence of the timing of the rising edges or falling edges of the interference electrical signal 162, and the time difference $\Delta_{TD}$ at the output 590 of the edge detector process. The time difference $\Delta_{TD}$ is determined as the time between the rising edge or the falling edge of the instantaneous frequency value at the output 575 and the modulation/scan synchronization signal 179. A series of time differences $\Delta_{TD}$ are translated into the depth and form images displayed by the computer 170.

Figure 6:
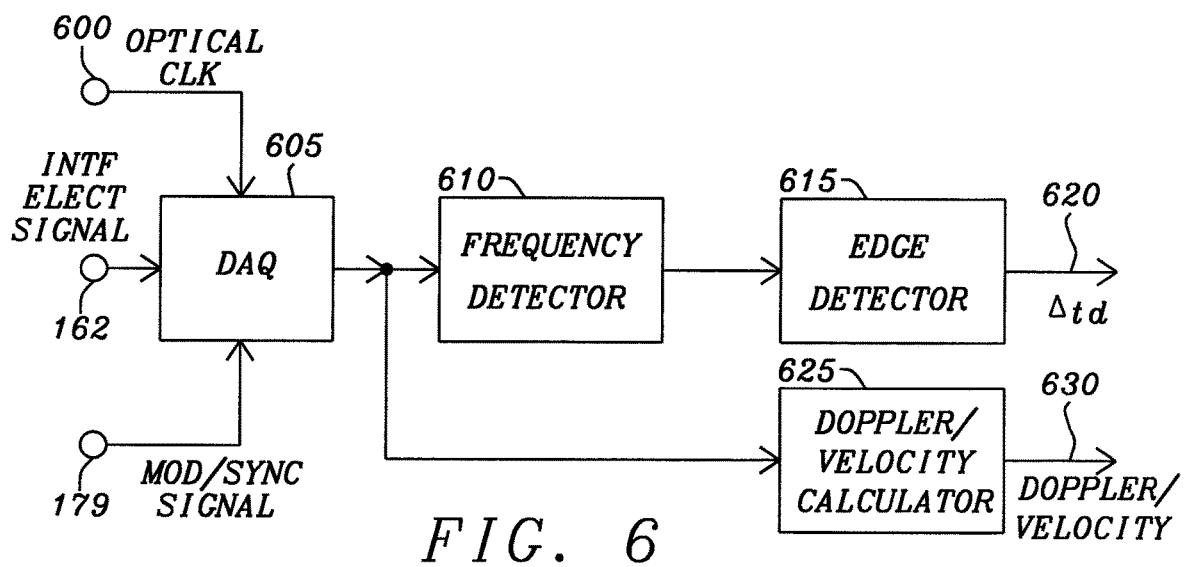
FIG. 6 is a block diagram of a digital signal processor configured for performing an SSM-TOI Doppler velocity measurement embodying the principles of the present disclosure.

FIG. 6 is a block diagram of a digital signal processor configured for performing an SSM-TOI Doppler velocity measurement embodying the principles of the present disclosure. FIG. 6 illustrates the sweep linearization correction performed by the sweep linearization calibrator 315 of FIG. 1C as utilized in the data acquisition and signal processor 165. When the TOI LiDAR system 100 operates under SSM-TOI mode, the speed information of the object being measured is encoded in the interference electrical signal 162. The interference electrical signal 162 as generated by the balanced photodetector 160 is digitized by a data acquisition module 605 triggered by the modulation/scan synchronization signal 179 from the modulating driver 175 and an optical frequency calibration clock 600 to convert the interference electrical signal 162 into a digitized signal at the output 607 of the data acquisition module 605. The digitized signal is linear in optical frequency space. The maximum frequency of the interference electrical signal 162 corresponds to the minimum ranging depth of the TOI LIDAR system 100 and is greater than a Nyquist sampling frequency of the data acquisition module 605.

The minimum frequency of the interference electrical signal 162 corresponds to the maximum ranging depth of the TOI LIDAR system 100. The time delay of the detected interference electrical signal 162 is measured at the interference electrical signal 162 envelope's falling edge. The optical frequency calibration clock 600 is generated from a Mach-Zehnder interferometer, a Fabry-Perot cavity, an etalon cavity, or any other interferometer or resonator suitable for generating the optical frequency calibration clock 600. The digitized signal 607 is an input to a frequency detector process 610 to determine the instantaneous frequency value. The instantaneous frequency value is the solution placed at the output 611 of the frequency detector process 610. In various embodiments, the optical frequency calibration clock 600 is not required when the digitized signal at the output 607 of the data acquisition module 605 is linear in optical frequency space intrinsically. In some implementations, the frequency detector may be realized as a short-time Fourier transformation, wavelet transformation, or other appropriate frequency detector processes. The instantaneous frequency value at the output 611 of the frequency detector process 610 is then processed by an edge detector process 615 to identify the interference's occurrence timing. The edge detector process 615 then calculates the time difference $\Delta_{TD}$ between the rising edge or the falling edge of the instantaneous frequency value and the modulation/scan synchronization signal 179 and then places the time difference $\Delta_{TD}$ placed as the output 620 of the frequency detector process 610.

In other implementations of the SSM-TOI Doppler velocity measurement, the digitized inference electrical signal at the output 607 of the data acquisition module 605 is the input to a Doppler velocity calculation process 625 to calculate the moving velocity of the target. The moving velocity of the target is the output 630 of the Doppler velocity calculation process 625. The Doppler velocity calculation process 625 is realized, in one implementation of the Doppler velocity calculation process 625, by measuring the time difference $\Delta_{TD}$ between the frequency of the interference electrical signal 162 of the consecutive forward and backward sweeps that are proportional to the moving speed of the object being measured. The symmetry of the modulation/scan synchronization signal 179 minimizes the error of the measurement. A series of time differences $\Delta_{TD}$ at the output of the edge detector 620 and the moving speed of the object being measured can be translated into the depth and the velocity, respectively, and form images displayed by the computer 170. In some implementations of the SSM-TOI Doppler velocity measurement, the velocity introduced Doppler frequency shift in the interference electrical signal 162 may be directly extracted using at least one low pass filter. The frequency shift can be detected and converted to a velocity electrical signal with no digital signal processing requirement.

Figure 7:
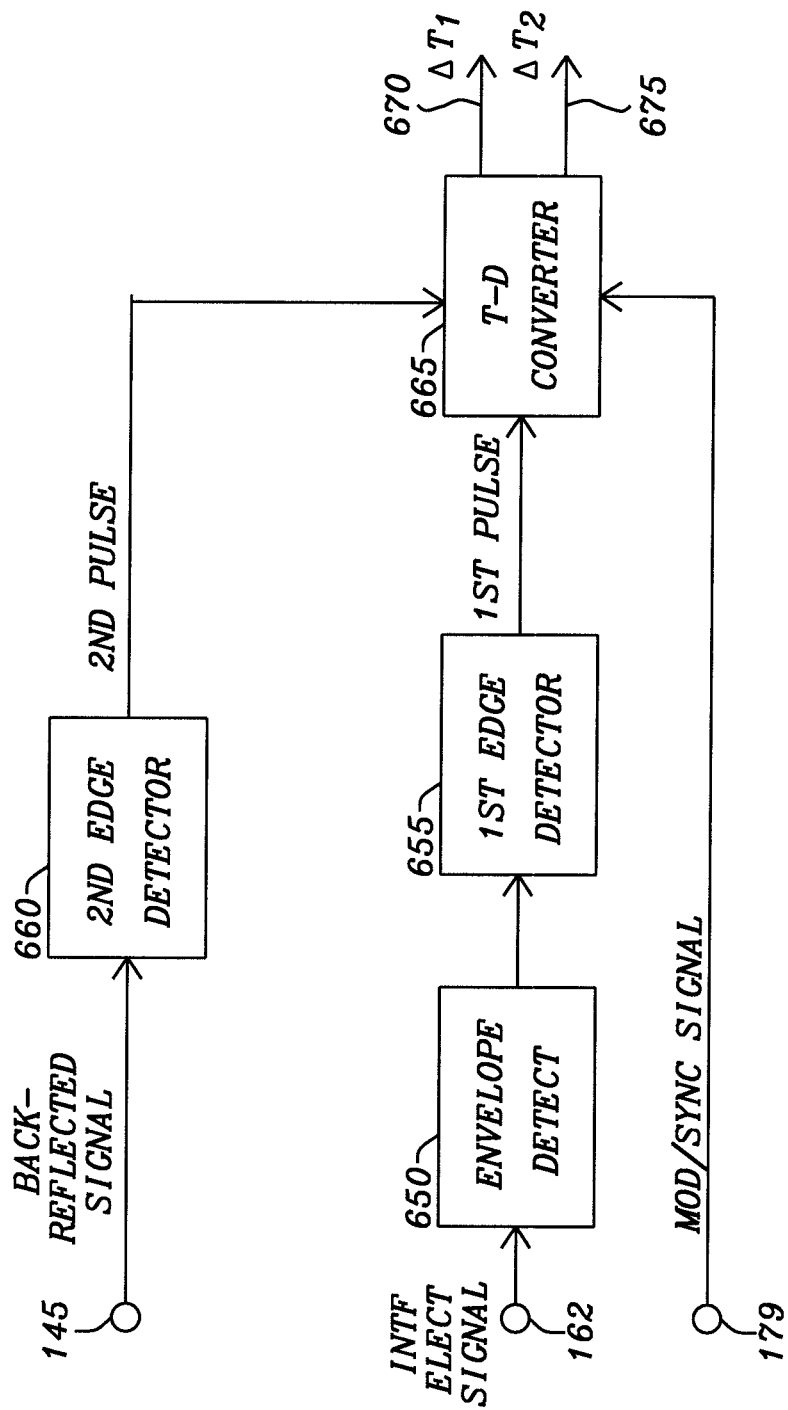
FIG. 7 is a block diagram of an integrated TOI and Time-of-Flight circuit embodying the principles of the present disclosure.

FIG. 7 is a block diagram of an integrated time-of-interference and time-of-flight circuit embodying the principles of the present disclosure. The interference electrical signal 162 generated from the balanced photodetector 160 is transferred to an envelope detector 650. The envelope detector 650 determines an envelope signal of the interference electrical signal 162 applied to the output 652 of the envelope detector 650. The envelope detector 650 is implemented as a radiofrequency (RF) power detector, a root mean square (RMS) detector, or a frequency demodulator. The envelope signal of the interference electrical signal 162 is then passed through a first edge detector 655. The first edge detector 655 generates a first pulse signal at the output 657 of the first edge detector 655 corresponding to the rising edge or the falling edge of the envelope signal of the interference electrical signal 162 at the output 657 of the envelope detector 650. The edge detector 655 is formed by an edge-to-glitch converter, an XOR gate and delay circuit, a differentiator circuit, or any edge detector circuit known in the art.

An electrical signal from the back-reflected coherent light 145 is extracted from a monitor channel of the balanced detector 160 to form a back-reflected electrical signal 145. The back-reflected electrical signal 145 from the monitor channel is the back-reflected electrical signal's 145 power spectrum and can be considered an envelope signal. The back-reflected electrical signal 145 is the input of the second edge detector 660. The second edge detector 660 generates a second pulse signal at the output 662 of the second edge detector 660.

The first pulse signal at the output 657 of the first edge detector 655, the second pulse signal at the output 662 of the second edge detector 660, and the modulation/scan synchronization signal 179 are applied to a multichannel time-to-digital converter 665. The multichannel time-to-digital converter 665 generates a first time difference signal at the output 670 of the time-to-digital converter 665. The first time difference signal $\Delta_{TD}$ is a digitized representation of the time between the rising edge or falling edge of the first pulse signal and modulation/scan synchronization signal 179 corresponding to the rising edge or the falling edge of the light source modulation/scan synchronization signal 179.

The multichannel time-to-digital converter 665 generates a second time difference signal $\Delta_{TD2}$ between the rising edge or falling edge of the second pulse signal at the output 662 of the second edge detector 660 and the modulation/scan synchronization signal 179 corresponding to the rising edge or the falling edge of the light source modulation. The first time difference signal $\Delta_{TD1}$ and the second time difference signal $\Delta_{TD2}$ are averaged or weighted averaged. The averaged or weighted averaged first time difference signal $\Delta_{TD1}$ and the second time difference signal $\Delta_{TD2}$ are translated into the depth and form images displayed by the computer 170.

Figure 8A:
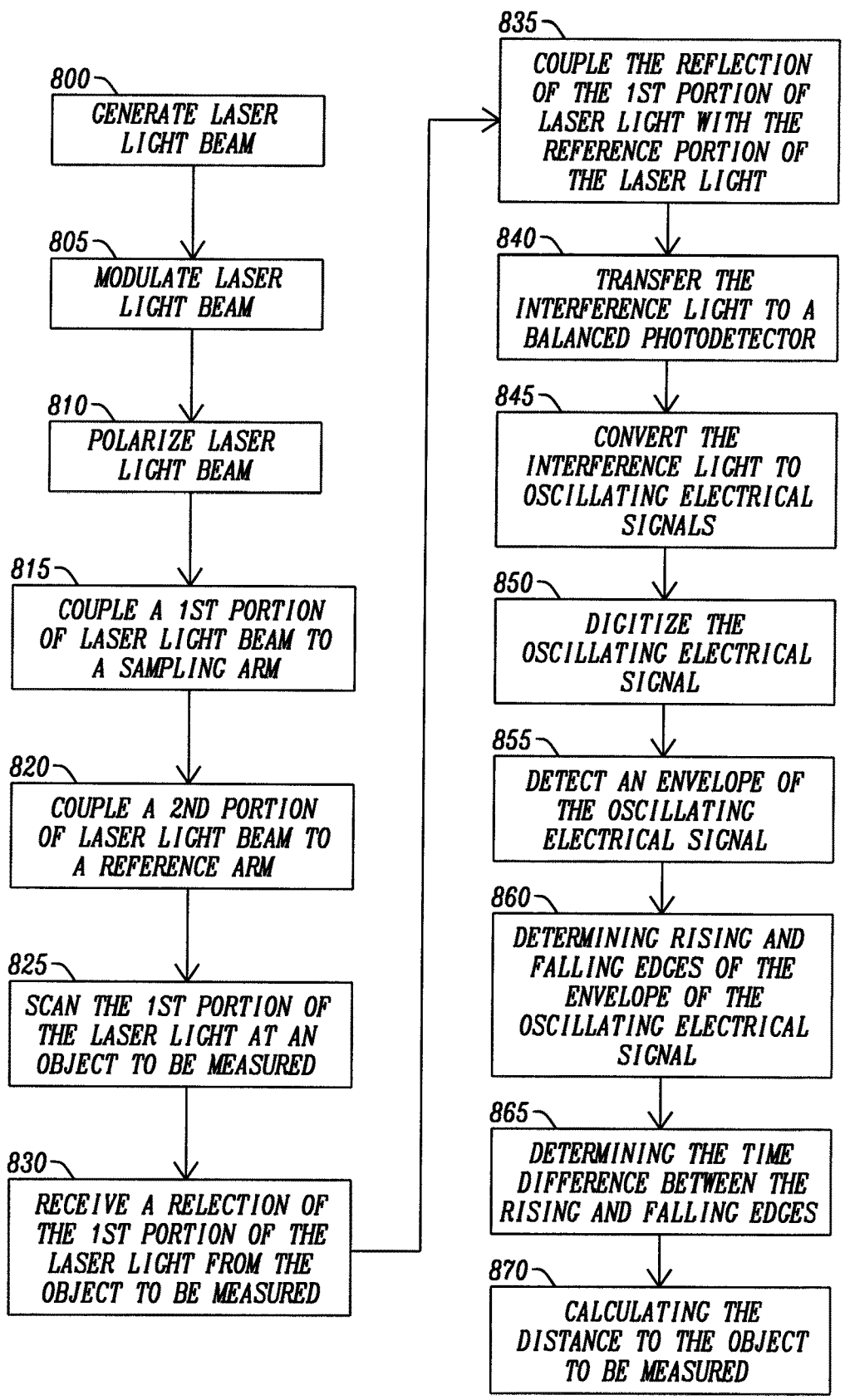
FIG. 8A is a flowchart of a method for determining an object's distance employing SSM-TOI electrical measurement embodying the principles of the present disclosure.

FIG. 8A is a flowchart of a method for determining an object's distance employing SSM-TOI electrical measurement embodying the principles of the present disclosure. A laser light beam is generated (Box 800). The laser light beam is modulated (Box 805) with a wavelength-modulated signal to adjust the laser light beam's wavelength or frequency. The laser light beam is then polarized (Box 810) to adjust the laser light's polarization states to maximize the amplitude of the optical interference signal or interference electrical signal.

The first portion of the laser light beam is coupled (Box 815) to a sampling fiberoptic cable. A second portion of the laser light beam is coupled (Box 820) to a reference optical paths. The first portion of the laser light beam is scanned (Box 825) at an object whose distance from the modulated laser light beam source is being determined.

A fractional part of the first portion of the laser coherent light beam is back-reflected and received (Box 830) from the object to be measured. The back-reflected portion of the first portion of the laser light beam is coupled (Box 835) with the second portion of the laser light beam to form the optical interference coherent light signal. The optical interference coherent light signal is transmitted (Box 840) to a balanced optical photodetector to convert (Box 845) the optical interference coherent light signal to an oscillating electrical interference signal. The oscillating electrical interference signal is digitized (Box 850). The maximum frequency of the interference electrical signal corresponds to the minimum ranging depth of the TOI LIDAR system and is greater than a Nyquist sampling frequency of the digitization. The minimum frequency of the interference electrical signal 162 corresponds to the maximum ranging depth of the TOI LIDAR system 100.

The digitized electrical interference signal envelope undergoes an envelope detection process to identify (Box 855) the envelope of the digitized electrical interference signal. The times of the rising or the falling edges of the envelope rising or falling edges of the envelope of the digitized electrical interference signal are determined (Box 860). The time difference between the rising or falling edges of the envelope of the digitized electrical interference signal and a modulation/scan synchronization signal is determined (Box 865), and the distance to the object to be measured is calculated (Box 870).

Figure 8B:
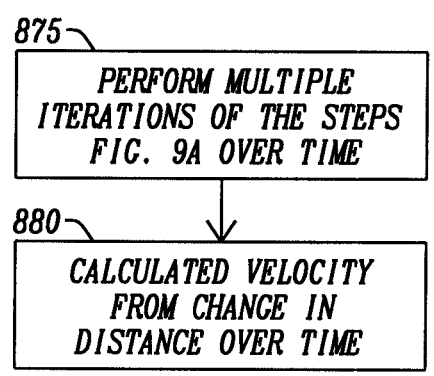
FIG. 8b is a flowchart of a method for determining an object's Doppler velocity employing SSM-TOI electrical measurement embodying the principles of the present disclosure.

FIG. 8B is a flowchart of a method for determining an object's Doppler velocity employing SSM-TOI electrical measurement embodying the principles of the present disclosure. The method for determining an object's Doppler velocity utilizing SSM-TOI electrical measurement begins with performing (Box 875) the steps of the method of FIG. 9A iteratively. The velocity of the object's Doppler velocity is determined (Box 880) as the change in distance over time.

While this disclosure has been particularly shown and described with reference to the preferred embodiments thereof, it will be understood by those skilled in the art that various changes in form and details may be made without departing from the spirit and scope of the disclosure. Particularly, the TOI LIDAR system 100 of FIG. 1A, FIG. 1B, or FIG. 1C may be implemented as fiber optics, bulk optics, integrated photonic circuitry, or any combination of optical photonic devices known in the art.

What is claimed is:

1. A time-of-interference (ToI) detection and ranging (LiDAR) system for measuring the distance from the ToI LiDAR system to an object based on time-frequency domain reflectometry, comprising:
   a coherent light source;
   a modulating controller connected to the coherent light source and configured for generating a pulsed wavelength control signal that is transferred to the coherent light source for modulating the coherent light source to generate a pulsed-wavelength-modulated coherent light emission;
   an interferometer connected with the coherent light source for receiving the pulsed wavelength-modulated coherent light emission and configured for partitioning the pulsed wavelength-modulated coherent light emission into a sample portion and a reference portion, wherein the sample portion of the pulsed wavelength-modulated coherent light emission is arranged to impinge upon the object to be measured, and the reference portion of the pulsed wavelength-modulated coherent light emission is arranged to provide a basis for determining the distance from the TOI LIDAR system to the object;
   a scanner connected to the interferometer to receive the sample portion of the pulsed wavelength-modulated coherent light, wherein the scanner is configured to physically transfer the pulsed wavelength-modulated coherent light's sample portion to the object and to scan the surface of the object with the pulsed wavelength-modulated coherent light, and the scanner is further configured to receive a back-reflected portion of the pulsed wavelength-modulated coherent light and transfer the back-reflected portion from the scanner to the interferometer;
   wherein the back-reflected portion of the pulsed wavelength modulated coherent light is coupled with the reference portion of the pulsed wavelength-modulated coherent light to form an optical interference light signal;
   a photodetector array configured to receive the optical interference light signal and convert the optical interference signal to an electrical interference signal;
   a signal processor in communication with the photodetector array to receive the electrical interference signal and convert the electrical interference signal to convert it to a digitized electrical interference signal; and
   a computer system configured programmed to calculate the time delay determined by the optical interference signal and generate a displayed imaging range based on the distance from the target.

2. The time-of-interference LiDAR system of claim 1 wherein the modulating controller is configured to modulate the coherent light source by controlling the coherent light source's driving current, adjusting the temperature of the narrow bandwidth light source, or adjusting the phase of the light emitted from the light source.

3. The time-of-interference LiDAR system of claim 1 wherein the interferometer comprises:
   a first coupler configured to receive the pulsed wavelength-modulated coherent light from the coherent light source and configured to divide the pulsed wavelength-modulated coherent light into a first portion of the pulsed wavelength-modulated coherent light and a second portion of the pulsed wavelength-modulated coherent light;
   a circulator connected to receive the first portion of the pulsed wavelength-modulated coherent light and configured such that the first portion of the pulsed wavelength-modulated coherent light enters a first port of the circulator and exits from the subsequent port to direct the first portion of the pulsed wavelength-modulated coherent light to the scanner;
   a sample arm connected to the first coupler to receive the first portion of the pulsed wavelength-modulated coherent light and transfer the first portion of the pulsed wavelength-modulated coherent light to the scanner;
   a reference arm connected to the first coupler to receive the second portion of the pulsed wavelength-modulated coherent light; and
   a second coupler configured to receive the back-reflected portion of the pulsed wavelength modulated coherent light, configured to receive the second portion of the pulsed wavelength modulated coherent light from the reference arm, and configured to couple the back-reflected portion of the pulsed wavelength modulated coherent light and the second portion of the pulsed wavelength modulated coherent light to form an optical interference light signal.

4. The time-of-interference LiDAR system of claim 3 wherein the interferometer further comprises:
   a polarization controller configured to receive the pulsed wavelength-modulated coherent light emission, transfer the pulsed wavelength-modulated coherent light emission to the first coupler, and configured to adjust the polarization states of the coherent light emission from the light source and maximize the amplitude of the optical interference signal or interference electrical signal.

5. The time-of-interference LiDAR system of claim 1 wherein the photodetector array is configured as a polarization-diversity balanced amplified detector and comprises at least one power monitor to measure the input power level to the photodetector array, wherein the power monitor output provides a modulated power level with a time delay associated with the object's distance.

6. The time-of-interference LiDAR system of claim 3 wherein the reference arm has a length greater than the sample arm's length, and the reference arm's optical path length is more than two times the system's maximum ranging depth.

7. The time-of-interference LiDAR system of claim 1 wherein the maximum frequency of the optical interference signal corresponds to the system's minimum ranging depth.

8. The time-of-interference LiDAR system of claim 1 wherein the signal processor is configured for determining an envelope of a digitized electrical interference signal.

9. The time-of-interference LiDAR system of claim 8 wherein the signal processor is configured to measure a time delay of the digitized electrical interference signal at a falling edge of the envelope of the digitized electrical interference signal.

10. The time-of-interference LiDAR system of claim 1 further comprising a scan controller configured to create the scan pattern that generates a scan synchronization signal and configured to apply the scan synchronization signal to the scanner to generate scan patterns that achieve the collection of the measurement information describing the object.

11. The time-of-interference LiDAR system of claim 1 wherein the time-of-interference LiDAR system is implemented as fiberoptics, bulk optics, integrated photonic circuitry, or any combination of optical photonic devices.

12. A method for determining an object's distance comprising the steps of:
generating a coherent light beam;
pulsed modulating the coherent light beam with a wavelength modulated signal;
coupling a first portion of the coherent light beam to a sample arm;
coupling a second portion of the coherent light beam to a reference arm;
scanning the first portion of the coherent light beam at an object whose distance from a source of the wavelength modulated coherent light beam is to be measured;
reflecting back a portion of the first portion of the wavelength modulated coherent light beam from the object is to be measured;
receiving the back-reflected portion of the wavelength modulated coherent light beam from the object to be measured;
coupling the back-reflected portion of the coherent light beam with the second portion of the coherent light beam to form an optical interference coherent light signal;
photodetecting the optical interference wavelength modulated coherent light signal to form an oscillating electrical interference signal;
digitizing the oscillating electrical interference signal;
detecting an envelope of the digitized electrical interference signal for determining the envelope of the digitized electrical interference signal;
determining the times of rising or falling edges of the envelope of the digitized electrical interference signal;
determining the time difference between the rising or falling edges of the envelope of the digitized electrical interference signal; and
calculating a distance to the object to be measure is calculated.

13. The method of claim 12 further comprises the steps of:
determining the object's Doppler velocity by performing the steps claim 11 iteratively; and
calculating the velocity of the object's Doppler velocity as the change in distance over time.

14. The method of claim 12 further comprises the steps:
adjusting polarization states of the coherent light beam to maximize the amplitude of the optical interference signal or interference electrical signal.

15. The method of claim 12 wherein a maximum frequency of the interference electrical signal corresponds to a minimum ranging depth of the measuring of the distance to the object and is greater than a Nyquist sampling frequency of the step of digitizing the interference electrical signal.

16. The method of claim 14 wherein the minimum frequency of the interference electrical signal corresponds to the maximum ranging depth of measuring the object's distance.

17. The method of claim 12 further comprising the step of implementing the method with fiberoptics, bulk optics, integrated photonic circuitry, or any combination of optical photonic devices.

18. An apparatus for determining an object's distance comprising:

means for generating a coherent light beam;
means for pulsed modulating the coherent light beam with a wavelength modulated signal to adjust the amplitude of the coherent light beam;
means for coupling a first portion of the coherent light beam to a sample fiberoptic cable;
means for coupling a second portion of the coherent light beam to a reference arm;
means for scanning the first portion of the coherent light beam is scanned at an object whose distance from a source of the modulated coherent light beam is to be measured;
means for reflecting back a portion of the first portion of the coherent light beam is from the object to be measured;
means for receiving the back-reflected portion of the coherent light beam from the object to be measured;
means for coupling the back-reflected portion of the coherent light beam with the second portion of the coherent light beam to form an optical interference coherent light signal;
means for photodetecting the optical interference coherent light signal to form an oscillating electrical interference signal;
means for digitizing the oscillating electrical interference signal;
means for detecting an envelope of the digitized electrical interference signal for determining the envelope of the digitized electrical interference signal;
means for determining the times of rising and falling edges of the envelope of the digitized electrical interference signal;
means for determining the time difference between the rising or falling edges of the envelope of the digitized electrical interference signal; and
means for calculating a distance to the object to be measure is calculated.

19. The apparatus of claim 18 further comprises:
means for determining the object's Doppler velocity by iteratively activating the means of claim 18 for determining the object's distance; and
means for calculating the velocity of the object's Doppler velocity as the change in the object's distance over time.

20. The apparatus of claim 18 further comprises:
means for adjusting polarization states of the coherent light beam to maximize the amplitude of the optical interference signal or interference electrical signal.

21. The apparatus of claim 18 wherein a maximum frequency of the interference electrical signal corresponds to a minimum ranging depth of measuring the distance to the object and is greater than a Nyquist sampling frequency of the means for digitizing the interference electrical signal.

22. The apparatus of claim 21 wherein the minimum frequency of the interference electrical signal corresponds to the maximum ranging depth the measuring the distance to the object.

23. The apparatus of claim 18 further comprising the step of implementing the apparatus with fiberoptics, bulk optics, integrated photonic circuitry, or any combination of optical photonic devices.

* * * * *